Figure 1:
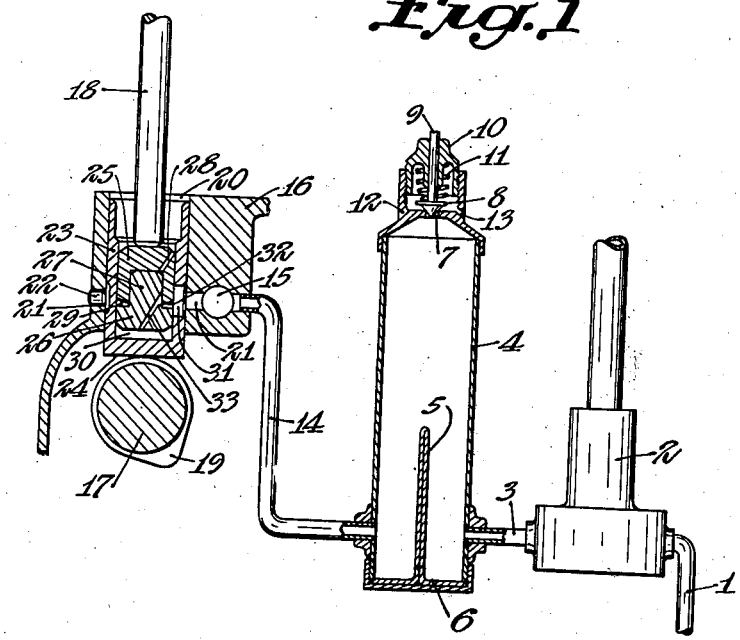

March 5, 1940.

F. C. ROCKSTROH 2,192,454

VALVE OPERATING MECHANISM

Filed April 15, 1938

Inventor
Frederick C. Rockstroh
By Williamson & Williamson
Attorneys

Patented Mar. 5, 1940

2,192,454

UNITED STATES PATENT OFFICE 2,192,454

VALVE OPERATING MECHANISM

Frederick C. Rockstroh, Minneapolis, Minn.

Application April 15, 1938, Serial No. 202,241

18 Claims. (Cl. 123—90)

This invention relates to thrust transmitting devices and more particularly to devices for transmitting thrust from an actuating element to an actuated element such as the valve operating mechanism in internal combustion engines.

Heretofore numerous devices have been suggested to transmit thrust in the valve mechanism of internal combustion engines, and in some of these devices bodies of liquid have been interposed between the valve operating device and the valve itself with means for regulating the amount of liquid to eliminate clearance between the actuating element and the actuated element. One great problem has been the elimination of gases from the body of liquid since the liquid utilized is in practically every instance the lubricant found in internal combustion engines for decreasing friction in various moving parts of the engine, and it has been found that large quantities of gases are carried in the lubricant throughout the system.

Another disadvantage of devices known at the present time is in the valve means for controlling the flow of liquid from the engine lubricating system to the body of liquid interposed between cooperating parts of the intake and exhaust valve assemblies in the engine. Many of these devices employ spring pressed ball check valves or valves having flat seats of relatively large surface area. To begin with the spring used to close the valve is undesirable since its constant flexing produces danger of frequent breakage and costly labor for repair. With the ball check valve and the disk type valve, operation in a successful manner is practically impossible due to the fact that minute particles of grit or carbon will lodge between the valves and their seats and prevent the liquid control valves from seating properly.

A further and very important disadvantage of previously known structures of this general type is that they are far too cumbersome and complicated. The automotive industry is constantly striving to simplify its power plants to cut down production costs and to eliminate the need for frequent servicing and repair.

One object of my invention, therefore, is the provision of what might be termed a hydraulic valve operator in which liquid from the engine lubricating system is utilized and in which gases are simply and effectively removed from at least that portion of the lubricant which is used in connection with such valve actuation.

Another object of the invention is the provision of centralized means for removing gases from the liquid with means for supplying liquid from the centralized gas removing means to a plurality of valve operators.

Another object of the invention is the provision of means for controlling the supply of liquid to the valve operators which is not only simple in construction but which will act positively and be uninfluenced by the possible presence of small particles of foreign materials in the liquid.

Still another object of the invention is the provision of a mechanism of this general type which eliminates the need for small springs or similar tempered resilient metallic parts which frequently fail under high speed reciprocating movement.

Figure 2:
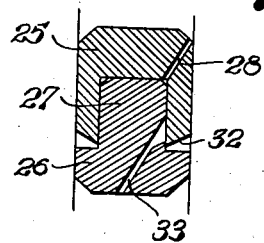

These and other objects and advantages of the invention will more fully appear from the following description made in connection with the accompanying drawing, wherein like reference characters refer to the same or similar parts, and wherein:

Fig. 1 is a fragmentary vertical section through a portion of the valve operating mechanism of an internal combustion engine with a gas separation chamber in vertical section and a liquid pump in elevation; and Fig. 2 is an enlarged vertical section through the correlated piston elements shown in Fig. 1.

The drawing shows a conduit 1 which is connected to the lubricating system of an internal combustion engine, liquid lubricant being supplied generally from a sump in the crank case of said engine. A liquid pump 2 is provided for putting the liquid in the system under pressure.

Connected to the pump by a conduit 3 is a chamber 4 having a baffle 5 at least in the lower portion thereof, said baffle being held in the bottom of the chamber by a removable cap 6 to give access to the chamber for the removal of sediment therefrom. The top of the chamber is provided with a vent 7 which is normally closed by a conical valve 8 whose stem 9 is slidably mounted in a plug 10, a spring 11 being interposed between the lower portion of the plug and the valve 8 to normally urge said valve down. The plug 10 is threaded in the cup-shaped upper portion 12 at the top of the casing. The cup-shaped top 12 is provided with a vent opening 13.

Liquid which is pumped into the chamber 4 from the pump 2 is permitted to lie in said chamber for an appreciable time to permit bubbles of gas to rise out of the liquid and into the upper portion of the chamber 4. The tension on the valve 8 is so adjusted that it will yield under pressure less than the pressure exerted by the pump 2. Thus when a quantity of gas forms in the upper portion of the separation chamber 4 it will eventually be compressed to such an extent that it will force its way past the valve 8 and out of the vent 13. Should it happen that small quantities of the liquid lubricant escape past the valve 8, such lubricant may be collected by any convenient means and returned to the crank case of the engine.

A conduit 14 extends from the lower portion of the separation chamber 4 on the opposite side of the baffle 5 from the point of connection of the inlet conduit 3, and said conduit 14 extends to and is connected with a bore 15 which is formed longitudinally of the internal combustion engine casting 16, said bore lying in said casting adjacent the engine cam shaft 17 and valve rods 18. With the general type of internal combustion engine construction shown in the drawing, a valve tappet element is usually interposed between the cam 19 and the valve rod 18 on each valve assembly. In the drawing there is shown a relatively large vertical bore 20 which extends downwardly through the casting 16 on the same axis as the valve rod 18, and a horizontal bore for each valve is formed by drilling through from the lefthand or outer side of the casting to communicate with the longitudinal bore 15, as shown at 21. A plug 22 may be used to close the outer end of the passageway thus formed.

Slidably mounted within the relatively large vertical bore 20 is a cup-shaped cylinder 23. The lower face 24 of said cylinder is adapted to bear against the working surface of the cam 19. Within the cylinder is slidably mounted a pair of co-operating pistons 25 and 26, the upper piston 25 being of substantially inverted cup-shape, and the lower piston 26 having an upwardly projecting central portion 27 which fits within the upper piston 25. A vent 28 in the upper piston permits the two piston elements to reciprocate relative to each other freely without influence from gases or liquids which might otherwise be entrapped between the upper face of the central projection 27 on the lower piston and the inner portion of the upper piston 25. It should be noted that there is a space or chamber 29 formed between adjacent portions of the two pistons due to the fact that the central portion 27 of the lower piston is in abutment with the upper face of the inside of the upper piston 25.

Let us assume that the chamber 30 which lies between the lower piston 26 and the bottom of the cylinder 23 has no liquid therein, but is adapted to contain a certain quantity of liquid in order to take up any clearance between the cam 19 and the valve stem 18, the latter resting upon the outer top face of the upper piston 25. Upon operation of the internal combustion engine liquid lubricant will be forced from the gas separation chamber 4 through the conduit 14 to the liquid distribution manifold which comprises the longitudinal bore 15 and an individual oil supply port 21 for each valve assembly. The liquid will pass through the opening 31 in the wall of the cylinder 23 and into the annular chamber 29 between opposing faces of the pistons 25 and 26. It will be seen from the drawing that the lower beveled edge 32 of the upper piston 25 is in the illustrated position covering the liquid conduit 33 which communicates with the liquid chamber 30. However, liquid under pressure will force the two pistons slightly apart and the conduit 33 in the piston 26 will be opened to permit liquid to flow into and fill the chamber 30. Liquid will flow into the chamber 30 until all clearance between the cam 19 and the valve rod 18 has been taken up. When this condition is reached the conduit 33 in the piston 26 will be closed by inward cooperating movement of the pistons 25 and 26. This movement will take place due to the fact that the under face of the piston 26 has more surface area than either of the annular piston faces which define the top and bottom of the smaller liquid chamber 29. Obviously pressure exerted upon the larger surface of the under side of the piston 26 will overcome the pressure exerted on the smaller surfaces in the smaller chamber.

With the above described telescoping piston arrangement it will be clearly seen that I have provided a hydraulic valve operator which eliminates the use of springs for valve operation and which also eliminates the use of ball check valves or disk valves. The inclined edge 32 at the bottom of the piston 25 cooperates with the upper end of the conduit 33 in the lower piston 26 to provide a sliding valve construction in which the pressure transmitted from the cam to the valve rod has no effect upon the cooperating surfaces which slidably cooperate to open and close the conduit 33. With a ball check valve or a disk valve the pressure of the liquid causes the valve element to pound against the seat with each operation thereof. This pounding which is naturally objectionable is, therefore, eliminated. The inclined surface 32 above mentioned provides a sharp corner which constitutes the leading edge of the movable valve element and small particles of carbon will in no way effect its operation.

It will be noted particularly in the enlarged view of Fig. 2 that the piston skirt edge 32 on the piston 25 is adapted to go slightly beyond the lower edge of the opening at the upper end of the conduit 33. This slight overlapping provides for a very small predetermined degree of movement of the pistons relative to each other after the valve has actually been closed. This is a very important feature of the invention since it provides control over the amount of allowable valve train clearance, this clearance being necessary due to unavoidable inaccuracies in the machining of the working surfaces of the cam. Furthermore, a slight operating clearance of a few thousandths of an inch in the valve train mechanism is usually desirable in preference to no clearance at all to insure the tightness of engine valve seating. Obviously the same construction could be illustrated by showing the valve just barely closed with a slight clearance space between the internal horizontal abutting surfaces of the two pistons, this clearance space being taken up by the cam in operation.

The construction illustrated and equivalent constructions embodying the features of my invention are extremely simple since the device interposed between the cam and the valve rod constitutes only three parts, namely, the cylinder 23 and the pistons 25 and 26. It will be further noted that there is practically a solid mass of metal transversely of the large vertical bore 20 on a line through the cylinder 23 and the two pistons. The parts operate with a close but freely sliding fit and they are so compactly arranged that there is no more and probably less room taken up than in a valve tappet construction of the commonly known purely mechanical type.

It should be borne in mind that other hydraulic tappets which have been devised heretofore have been so constructed that only a certain limited amount of expansion can take place to adjust the clearance between the tappet actuating member and the tappet actuated member. It will be readily seen, however, that my invention permits practically unlimited expansion in the tappet to take up any desired amount of clearance. Furthermore, in the present known types of tappets of this general class, the oil inlet opening is generally limited to a small opening, usually not over .005 of an inch. In practically every internal combustion engine used for motor vehicles, several valves are left open when the motor is stopped. This naturally leaves the strong pressure of the motor valve spring on the hydraulic tappet and this pressure on the tappet causes the oil to seep out of the oil reservoir in the tappet. Thus when the motor is again started after standing for a comparatively short time, several of the tappets will be empty of oil, and there will be considerable clearance between the tappet and the valve rod or tappet actuated member. With a cold motor and the comparatively small oil inlet which is the only type of inlet which has heretofore been devised, the heavy cold oil will not immediately flow back into those empty tappets, and naturally considerable noise will result until the motor has been run for several minutes. With my improved valve construction, however, the extent of opening up the valve to permit oil to flow into the liquid reservoir in the tappet is dependent upon the amount of clearance to be taken up between the tappet and the motor valve rod. Thus if the liquid chamber is empty there is more clearance to take up and my improved oil control valve will open to greater extent to permit the oil to flow into the liquid chamber almost instantaneously. Under normal conditions when the motor is warm and the oil flows freely if it is necessary to take up some clearance which is very slight, the valve will only open a slight distance to permit the required small amount of liquid to flow into the liquid chamber in the tappet.

Referring to the system as a whole, it will be seen that I have provided a hydraulic valve operating element with a central chamber for removing gases from the liquid lubricant supplied from the crank case and means for conveying liquid from the said chamber to each valve operator in the engine. It is naturally understood that a plurality of valve operators is present in an internal combustion engine, there being two valves with operators therefor for each compression cylinder in an internal combustion engine.

It should be further understood that while the embodiment of my invention shown and described is one which might be termed a hydraulic tappet such as is generally found between the cam and the lower end of the valve rod, a similar structure with exactly the same functions and features can be embodied in a rocker arm construction.

It will be further understood that various changes may be made in the form, proportions, details and arrangement of the various parts without departing from the scope of my invention.

What is claimed is:

1. A hydraulic tappet comprising a cylinder adapted to hold a body of liquid, a pair of pistons within said cylinder and defining a pair of chambers in said cylinder, one of said pistons having a port therein connecting said chambers, said cylinder having an inlet passage therein communicating with one of said chambers, and said pistons comprising valve means adapted to open and close under fluid pressure to control the passage of liquid from one of said chambers through said port to the other of said chambers.

2. A hydraulic tappet comprising a cylinder adapted to hold a body of liquid, a pair of relatively movable elements within said cylinder, said elements constituting valve means controlling the flow of liquid into said cylinder, said relatively movable elements having opposed surfaces adapted to contact each other after a predetermined degree of movement of said elements relative to each other in excess of the movement required to close said valve means.

3. A hydraulic tappet comprising a supply of liquid under pressure, a cylinder, a pair of correlated pistons having opposed fractional surfaces exposed to liquid pressure to produce opposite relative movement of said pistons, whereby axial tappet clearance adjustment is produced, one of said pistons and said cylinder defining a liquid chamber, the surface of said piston defining said chamber being of greater area than said opposed fractional piston surfaces, said pistons including valve means controlling the flow of liquid to said chamber, and said valve means being controlled by the flow of liquid under pressure into said chamber.

4. In a mechanism of the class described, a tappet, a tappet actuating member, a tappet actuated member, a source of liquid under pressure, said tappet including hydraulic means for effecting the adjustment of axial clearance between said actuating member and said actuated member, and said tappet also including valve means comprising a pair of correlated pistons operated solely by liquid under pressure for maintaining the clearance adjustment so effected.

5. A hydraulic tappet comprising a cylinder, a pair of correlated pistons defining two chambers within said cylinder, a source of liquid under pressure, said pistons comprising valve means opened and closed by said liquid under pressure for controlling the flow of liquid to one of said chambers and said pistons having abutting surfaces for the transmission of thrust.

6. In a hydraulic tappet, a tappet actuating member, a tappet actuated member, said tappet including a chamber adapted to receive a body of liquid and having a port communicating with said chamber, variably movable means associated with said tappet for adjusting the clearance between said tappet and said members, a valve adapted to be opened and closed by liquid under pressure to control the flow of liquid between said port and said chamber, the movement of said valve being variably dependent upon the clearance to be adjusted between said tappet and said members, and said port being of a size substantially as great as the clearance adjusting range of said tappet.

7. In a hydraulic tappet, a tappet operating member adapted to actuate said tappet periodically, a tappet operated member, said tappet including a cylinder and a pair of correlated pistons comprising valve means, said pistons defining two liquid containing chambers in said cylinder, a supply of liquid under pressure, said liquid being directed against said pistons and valve means to effect the opening and closing of said valve means, and said valve means being synchronized with said tappet operator whereby opening and closing movement of said valve means is effected between actuations of said tappet by said tappet operator.

8. A hydraulic tappet having a chamber adapted to contain a body of liquid and relatively movable fluid operated elements providing sliding valve means in conjunction with said tappet chamber, the leading edge of at least one valve element being formed at an angle of less than 90° to provide a cutting leading edge.

9. A hydraulic tappet comprising a supply of liquid under pressure, a cylinder, a pair of correlated pistons having opposed surfaces exposed to liquid pressure to produce opposite relative movement of said pistons, whereby axial tappet clearance adjustment is produced, one of said pistons and said cylinder defining a liquid chamber, the surface of said piston defining said chamber having a greater area exposed to liquid pressure than said first mentioned opposed piston surfaces, said pistons including valve means for controlling the flow of liquid to said chamber, and said valve means being controlled by the flow of liquid under pressure into said chamber.

10. The structure in claim 9 and said pistons being movable relative to each other a pre-determined distance in excess of valve closing movement, whereby a pre-determined axial operating clearance is provided in the engine valve train mechanism.

11. In a hydraulic tappet construction, a supply of liquid under pressure, a plurality of hydraulic tappets having chambers therein to hold bodies of said liquid, and fluid operated valve elements controlling the flow of liquid between said chamber and said liquid supply, each of said valve elements being movable and the sealing surfaces of said valve elements being so positioned that they are free from thrust transmitted through said tappets.

12. A hydraulic tappet comprising a cylinder having a chamber adapted to contain a body of liquid under pressure, and thrust elements within said cylinder comprising a fluid operated valve assembly to control the flow of liquid to said chamber, said assembly being movable relative to said cylinder and having valve sealing surfaces free from transmission of thrust.

13. In a thrust transmitting mechanism, an actuating member, an actuated member, a source of liquid under pressure, a hydraulic tappet interposed between said actuating member and said actuated member and adapted to transmit thrust therebetween, said tappet having means for holding a thrust transmitting body of liquid, and said tappet including telescoping sliding valve members controlling the passage of liquid between said body and said source of liquid, and said telescoping valve members being subjected to and actuated by said liquid under pressure for both opening and closing said sliding valve.

14. The structure in claim 13 and said members including abutting surfaces for controlling the range of telescoping movement of said members in one direction.

15. In a mechanism of the class described, an actuating member, an actuated member, a supply of liquid under pressure, a hydraulic tappet interposed between said actuating member and said actuated member and in the line of thrust between said members, said tappet including a chamber adapted to contain a body of thrust transmitting liquid and a pair of relatively movable liquid actuated telescoping valve elements adapted to open and close under the influence of liquid under pressure and also adapted to transmit thrust and comprising valve means between said liquid supply and said chamber.

16. The structure in claim 15 and said relatively movable elements including abutting surfaces for controlling the range of telescoping movement thereof in one direction.

17. In an internal combustion engine valve train mechanism, an actuating member, an actuated member, a source of liquid under pressure, a casing, a cylinder adapted to reciprocate in said casing and also adapted to hold a body of liquid, a pair of telescoping elements defining two fluid chambers in said cylinder, said telescoping elements having exposed piston face surfaces subjected to liquid under pressure to produce opposite relative movement of the elements, said elements also including opposed surfaces adapted to contact each other to limit the range of telescopic movement of said elements in one direction, and said elements further constituting valve means and including valve sealing surfaces free from transmission of thrust from said actuating member to said actuated member.

18. The structure in claim 17 and said elements additionally defining an air chamber and also including means for venting said air chamber.

FREDERICK C. ROCKSTROH.